(12) United States Patent
Murai et al.

(10) Patent No.: US 7,968,815 B2
(45) Date of Patent: Jun. 28, 2011

(54) RESISTANCE SPOT WELDER AND A BEARING/SPINDLE ARRANGEMENT FOR THE RESISTANCE SPOT WELDER

(75) Inventors: Toshio Murai, Kanagawa (JP); Yoshiaki Iwamoto, Kanagawa (JP)

(73) Assignee: Dengensha Manufacturing Company Limited, Kawasaki-shi, Kanagawa-ken (JP)

( * ) Notice: Subject to any disclaimer, the term of this patent is extended or adjusted under 35 U.S.C. 154(b) by 1013 days.

(21) Appl. No.: 11/727,765

(22) Filed: Mar. 28, 2007

(65) Prior Publication Data

US 2007/0228018 A1 Oct. 4, 2007

(30) Foreign Application Priority Data

Mar. 31, 2006 (JP) .............................. P2006-097626

(51) Int. Cl.
*B23K 11/11* (2006.01)
(52) U.S. Cl. ...................... 219/86.25; 219/86.1; 219/90
(58) Field of Classification Search ............... 219/86.1, 219/86.25, 90; 901/42
See application file for complete search history.

(56) References Cited

U.S. PATENT DOCUMENTS

| 4,559,438 A * | 12/1985 | Nakadate et al. ............... 219/90 |
| 4,694,135 A * | 9/1987 | Nagel et al. .................. 219/110 |
| 6,706,990 B1 | 3/2004 | Olsson |
| 2003/0189029 A1* | 10/2003 | Kilabarda et al. ......... 219/86.25 |

FOREIGN PATENT DOCUMENTS

| DE | 3626236 A | * | 2/1988 |
| DE | 4304790 A1 | * | 8/1994 |
| GB | 2 278 562 A | | 12/1994 |
| JP | 58107280 A | * | 6/1983 |
| JP | 58107281 A | * | 6/1983 |
| JP | 06182562 A | * | 7/1994 |
| JP | 7-63852 | | 7/1995 |
| JP | 7-35662 | | 8/1995 |
| JP | 7-50062 | | 11/1995 |
| JP | 2005-028454 | | 2/2005 |
| JP | 2005-169507 | | 6/2005 |

OTHER PUBLICATIONS

Machine translation (MT) of DE 3626236 A; May 19, 2010.*

* cited by examiner

*Primary Examiner* — Stephen J Ralis
(74) *Attorney, Agent, or Firm* — Drinker Biddle & Reath LLP (57) ABSTRACT

A resistance spot welder including a first plate, a second plate rotatably connected to the first plate through a shaft and driven on the shaft by an actuator, gun arms removably fixed on and electrically insulated with the first and second plates, and electrode tips confronting each other and fixed on the gun arms.

7 Claims, 5 Drawing Sheets

RESISTANCE SPOT WELDER AND A BEARING/SPINDLE ARRANGEMENT FOR THE RESISTANCE SPOT WELDER

CROSS-REFERENCE TO RELATED APPLICATIONS

This application is based upon and claims the benefit of priority from prior Japanese patent application No. 2006-097626, filed on Mar. 31, 2006, the entire contents of which are incorporated herein by reference.

BACKGROUND OF THE INVENTION

The present invention relates to the field of a resistance welder and, more particularly, to a resistance spot welder, in which one gun arm and the other gun arm are rotatably connected through a spindle (as will be called the "shaft") and in which the power of an actuator is mechanically transmitted to the one gun arm, to rotate the gun arm on the shaft thereby to generate a pressure necessary for the welding operation between a pair of electrode tips supported at the leading ends of the two gun arms, whereby a welding current is fed to plates pressed to be welded between the electrode tips.

In an X-type resistance spot welder (as will be called the "X-Gun") of the related art including a robot spot welding gun, a portable spot welding gun or a stationary type spot welder, one gun arm is set on the movable side whereas the other gun arm is set on the stationary side, and these gun arms are connected by a spindle rotating device. In the spindle rotating device of this kind, the power of the actuator such as an air cylinder or an electric motor is transmitted to one gun arm so that the gun arm is rotationally driven on the shaft. As a result, a pair of confronting electrode tips, as individually supported by the gun arms, are brought close to or apart from each other.

The spindle connecting device of the X-gun includes the following examples in the related art. In the example (as referred to JP-B-7-63852, page 2, column 3, line 27-column 4, line 7), with a view to adjusting the clearance to be formed by the wear of a thrust washer due to the rotational motion of the shaft thereby to prevent the misalignment of the leading end of an electrode tip, an insulating thrust washer is arranged on the inner side or the outer side of the bifurcation of the gun arms and in alignment with a shaft (or a hinge pin), and a pushing force is applied in a direction substantially normal to the side of the thrust washer to move the thrust washer in the same axial direction as that of the hinge pin so that the clearance formed on the sliding face of the thrust washer is eliminated to prevent the misalignment between the electrode tips to be formed at the leading ends of the gun arms.

In a related spindle connecting device of another example (as referred to JP-UM-B-7-35662, page 2, column 3, line 6-line 15), bearings having flanges (or ring members having an L-shaped longitudinal section) are removably mounted from the two sides in the bearing holes of the support portions of two gun arms, a support pin is inserted into the bearings with the washers and the flanges abutting against the flanged bearings. The support pin has a lubricant passage in its axial direction. The lubricant passage has a thin oil passage communicating therewith in the abutment faces between the washers and the flanges. The bearings and the washers are fastened and fixed between the brackets.

As another example, there is a related spindle connecting device (as referred to-JP-UM-B-7-50062, page 2, column 3, line 6-line 15), in which the shaft is inserted in the hinge portion of the two gun arms to connect them rotatably. Between the hinge portions connected, an electric insulating having a wear-resisting material applied to the annular surface is fixed by a stopper pin, whereby the connecting portion of the hinge portions is reliably insulated to reduce the wear of the hinge portions.

As another example, there is an related X-gun (as referred to JP-A-2005-28454, [0012]-[0022]), in which a shaft (or a pin) is inserted into bearing holes of two intermediate arms, one of which is connected rotatably on the shaft. Gun arms are inserted and fixed in insulating bushings attached to the intermediate arms. The gun arms and the intermediate arms are electrically insulated. Gun brackets are connected to the shaft at the center, and a welding transformer is fixed to the extensions of the gun arms. To an action fork having two symmetric plates connected on the common axis to the shaft and arranged in parallel, there are connected the intermediate arm supporting one gun arm and a cylinder body for establishing a pressing stress necessary for rotating on the shaft at the intermediate arm for supporting the other gun arm, so that the weight of the X-gun with the welding transformer is reduced.

As another example, there is a related welding gun (as referred to JP-A-2005-169507, [0006]-[0011]), in which one gun arm is rotatably connected on a moving side to a gun bracket through the spindle connecting device, and in which the other gun arm is integrally connected and fixed as a fixed side to the leading end of the gun bracket, so that an electrode tip on the stationary side is brought, prior to the electrode tip on the moving side, by the control on the robot side into contact with a workpiece.

The related are disclosed in JP-B-7-63852 needs not only the insulating washer for arranging the washer to insulate the gun arms on the inner side and the outer side of the bifurcation of the gun arms, on the same axis as that of the shaft but also the fixing means, so that the number of parts is accordingly increased to enlarge the structure.

The related art disclosed in JP-B-UM-7-35662 needs the oil passage formed in the abutment face between the washer and the flange portion and branched from the lubricating oil passage formed in the axial direction of the shaft, so that the structure of the spindle connecting device is accordingly complicated to require a large step number for the manufacture.

In the related art disclosed in JP-B-UM-7-50062, the electric insulator is positioned and fixed at the connecting hinge of the two gun arms by the positioning and rotation-stopping pins, and the wear-resisting annular plate is adhered to the mutually sliding faces of the electric insulator, so that the structure of the spindle connecting device is accordingly complicated.

The related art disclosed in JP-A-2005-28454 does not need the electric insulation at the shaft of the spindle connecting device in that the gun arms are inserted and fixed through the insulating bushings in the two intermediate arms rotatably connected by the spindle connecting device. The gun brackets, the plates supporting the actuator and the intermediate arm are connected on a common axis by the spindle connecting device. Thus, the axial length of the shaft is enlarged, and the plates are needed in addition to the gun bracket, so that the number of parts and the number of manufacturing steps are accordingly increased. Moreover, no consideration is disclosed into the oilless spindle connecting device (or the oilless spindle) and the cooling device.

In the related art disclosed in JP-A-2005-169507, the stationary side arm and the gun bracket are integrated. However, the spindle connecting device discloses the constitution of the spindle connecting device of the X-gun, but fails to simplify and lighten the spindle connecting device needing no insulation of the shaft.

The X-gun of the related art mostly needs the electric insulation at the shaft so that the spindle connecting device is complicated to a large size. Moreover, the gun brackets or the gun arms are individually assembled as single parts having independent functions, and the design has to be changed, each time the shape and size of the panel work are varied, thereby to raise a cause for a cost increase. In the spindle connecting device of the related art, moreover, the lubricant is fed from the shift inside to the sliding faces. As a result, it is difficult to make an oilless structure for clearing the calculated lifetime on the design of the shaft. Moreover, the X-gun of the related art has found it difficult to make compact the wiring structures of the secondary circuit of such a welding unit and the cooling circuit as includes the secondary conductor and/or the shut connected from the welding transformer to the electrode tips. Moreover, the X-gun of the related art has failed to solve the problem that only the gun arms are exclusively replaced according to the variation of the shape of a weld workpiece.

SUMMARY

It is therefore an object of the invention to provide a resistance spot welder in which a spindle connecting device, which connects at least one gun arm rotatably through a shaft to two highly conductive gun arms made of a cast alloy of a copper group or an aluminum group is simplified, the durability is improved and the size and weight are reduced.

In order to achieve the object, according to the invention, there is provided a resistance spot welder comprising:

a first plate;

a second plate, rotatably connected to the first plate through a shaft, and driven on the shaft by an actuator;

gun arms, removably fixed on and electrically insulated with the first and second plates, respectively, and electrode tips, confronting each other, and fixed on the gun arms, respectively.

The first plate may be directly fastened on a robot arm.

The first plate may include a pair of plates which confront each other and are arranged in a first direction with a predetermined space therebetween. The actuator and a welding transformer may be arranged in the predetermined space in a second direction perpendicular to the first direction.

The resistance spot welder may further include: a cylindrical collar, inserted concentrically on the shaft, and being shorter than the shaft; a first bearing, inserted between the shaft and the collar, and including a first bearing portion adapted to be slid on the shaft and a first flange portion radially rising on the first bearing portion; and a second bearing, including a second bearing portion adapted to be slid on the shaft and a second flange portion radially rising on the second bearing portion. The first flange portion and the second flange portion may be arranged concentrically on the shaft and held in contact with each other. The first plate may be integrally fixed on the second bearing and the second plate may be integrally fixed on the collar. A clearance for reserving a lubricating medium may be formed in the vicinity of a central portion between the shaft and the collar.

The first plate may be fixed on the second bearing by a plurality of fastening members in a fastening direction. The fastening direction may be eccentric from and parallel to an axial direction of the shaft. The plurality of fastening members may be provided in an electrode tip side of the shaft in a radial direction of the shaft.

A seal member for sealing the clearance from an outside maybe fitted and fixed in annular recessed groove defined among the second plate, the first bearing and the second bearing.

First connecting members fixed on one ends of the first plate and the second plate and second connecting members formed integrally with the gun arms in a direction perpendicular to a longitudinal direction in which the gun arms extend may be removably fixed in an insulated state.

A surface of at least one of the first and second flange portions at which the first and the second flange portions are held in sliding contact with each other may be subjected to a hardening heat treatment with a nitride layer.

The welding transformer may be supported between the pair of plates of the first plate.

The welding transformer may be arranged between the shaft and the actuator. A longitudinal direction of the welding transformer and an axial direction of a pressure rod driven by the actuator may be substantially in parallel to each other.

DETAIL DESCRIPTION OF PREFERRED EMBODIMENTS

The invention is embodied by an X-Gun, which is provided with a drive unit constituted to include a servo motor, a gall screw and a ball nut. The servo motor is controlled by setting a program according to a welding sequence and a welding parameter. In the welding head connected through a shaft to an overlapped hinge of two gun arms, one gun arm is rotationally driven around said shaft, and one of electrode tips disposed at the leading ends of the individual gun arms is synchronized, in its position control and in a relative speed and pressure control at their approaching time, as one of axes of a robot device by the digital control from at lest one controller. The embodiments of the invention are described in the following with reference to the accompanying drawings.

Figure 1:
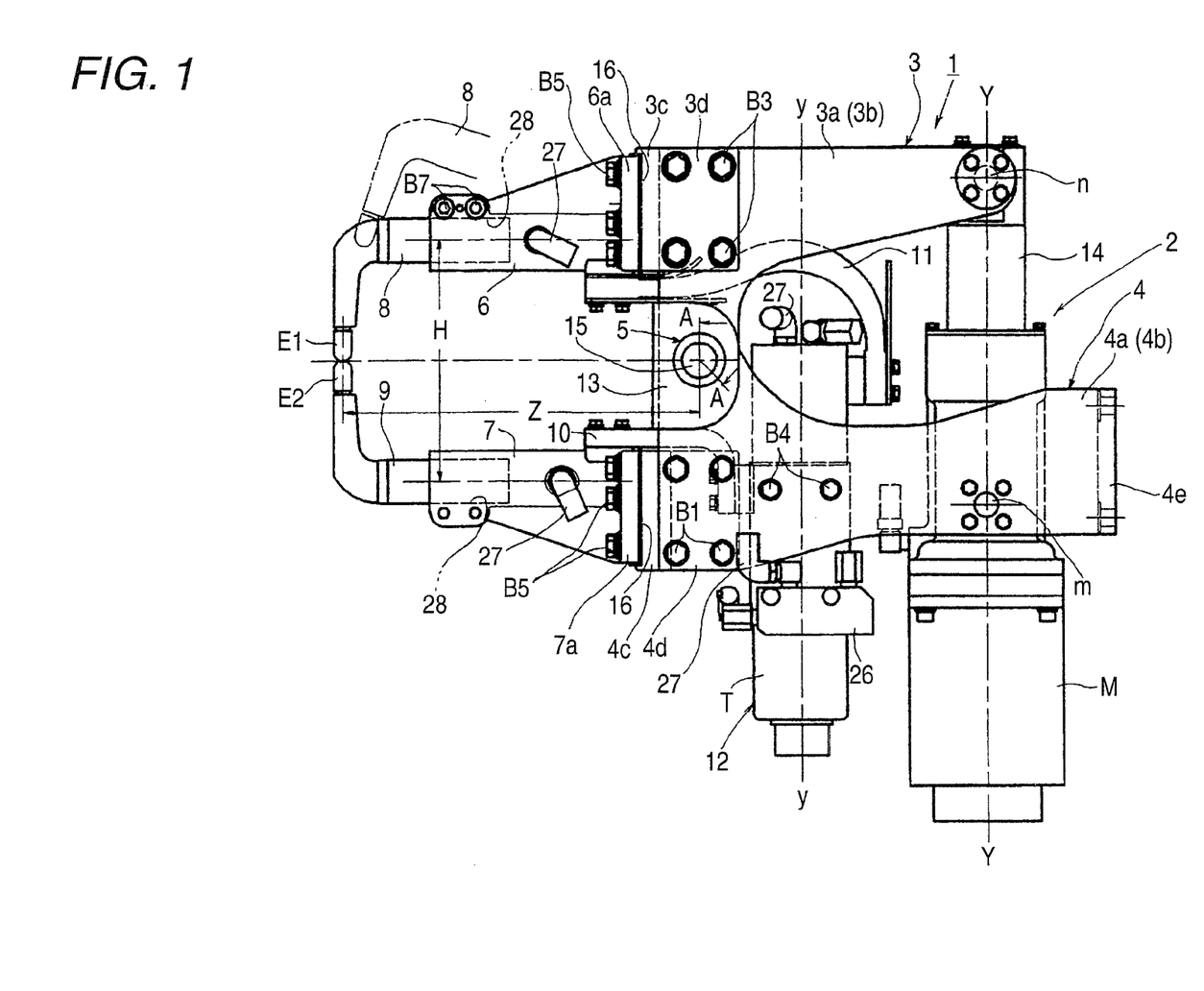
FIG. 1 is an assembly diagram showing the entire side elevation of an X-type robot welding gun according to an embodiment of a resistance spot welder of the invention.
Figure 2:
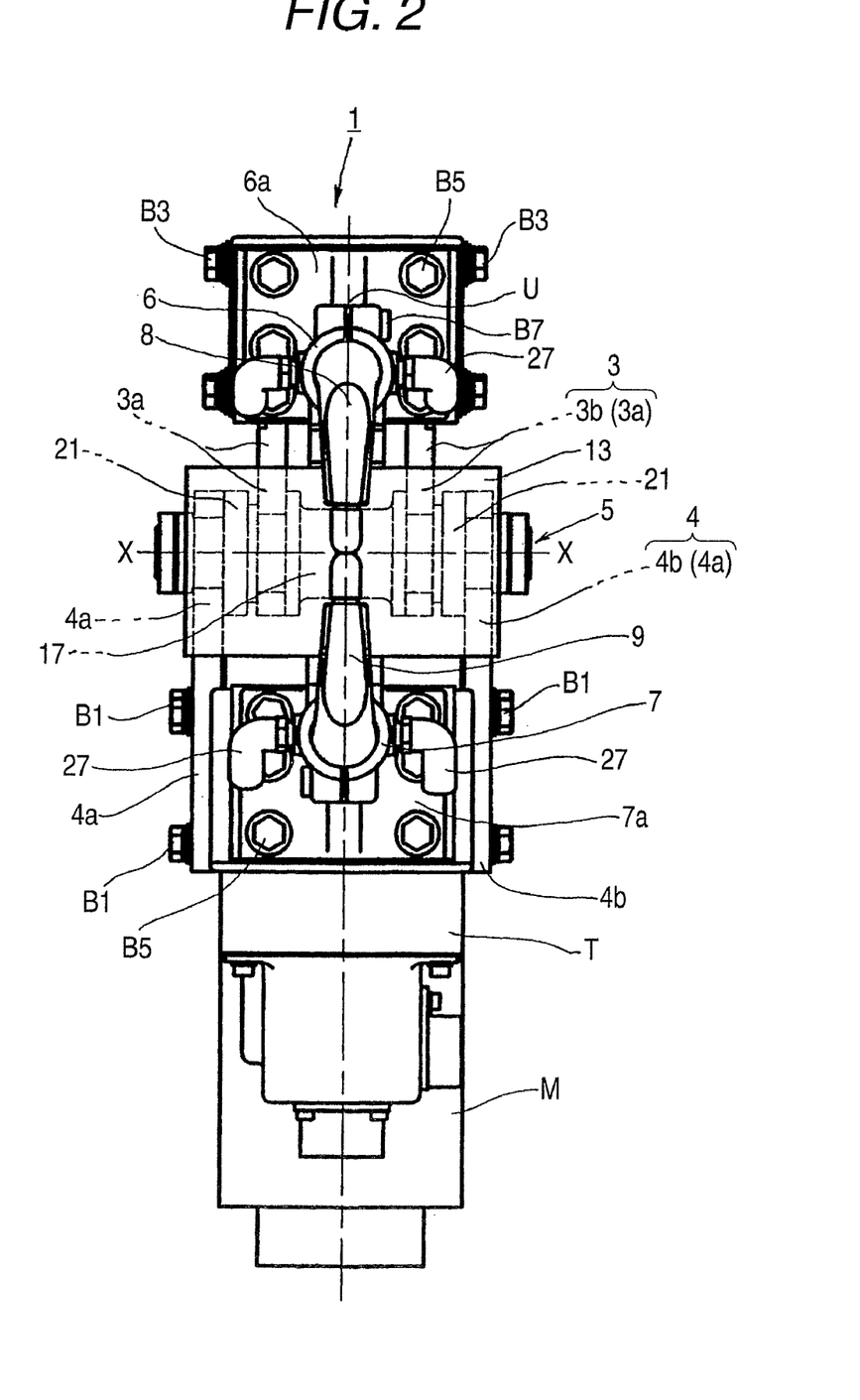
FIG. 2 is an exterior front elevation of the apparatus of the invention.
Figure 3:
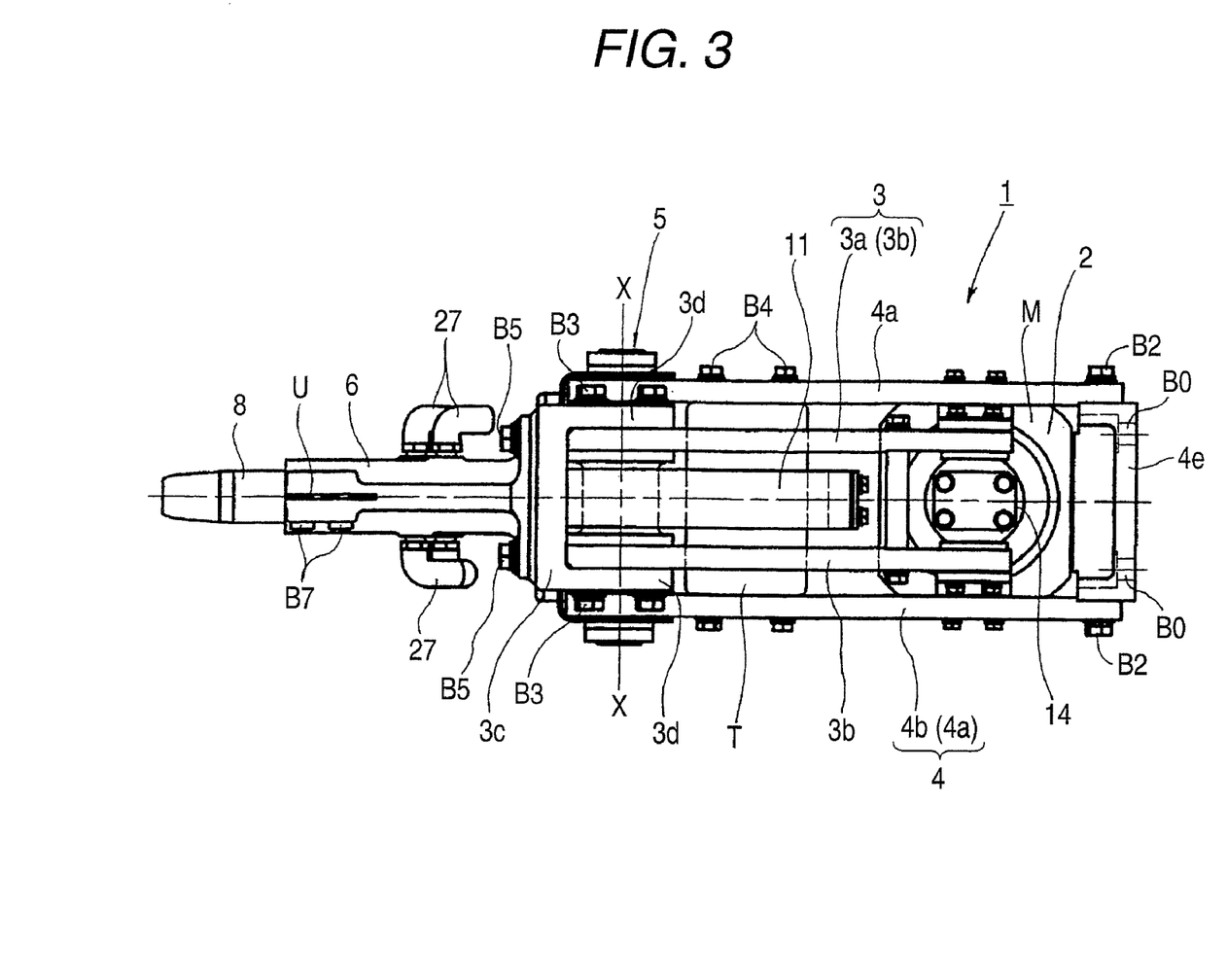
FIG. 3 is an exterior front elevation of the apparatus of the invention.

In FIG. 1, FIG. 2 or FIG. 3, an X-gun 1 includes a drive unit 2, a moving side plate 3 and a stationary side plate 4. The moving side plate 3 is rotatably connected by a spindle connecting device 5 to the stationary side plate 4, which acts as a gun bracket for supporting the drive unit 2 and a gun arm. The individual plates 3 and 4 are made of a light material hardly subject to spatters, such as a nonferrous light metal, hardened plastics or hardened carbon fibers. There are further included gun arms 6 and 7, which are made of a copper alloy and which are removably fixed on the leading ends of the plates 3 and 4, respectively. Further included tip holders (or round arms) 8 and 9, which are made of a copper alloy and which are so removably fixed as to confront the leading ends of the individual gun arms 6 and 7. Further included a pair of electrode tips E1 and E2, which are replaceably supported on the leading ends of the tip holders 8 and 9. A welding transformer T is connected as a welding unit 12 to the gun arms 6 and 7 through a secondary conductor 10 made of a copper alloy and a flexible shunt 11 made of copper. In the welding unit 12, moreover, there is assembled a cooling device such as a circulating line cooling tube or a cooling water passage.

An electric motor M or an air cylinder is used as the actuator of the drive unit 2. In this case, the actuator drives a guide rod 14 linearly with the rotating motion of about 3,000rpm of the electric motor M by a linear motion conversion mechanism such as the not-shown ball spring or a ball nut. As a result, one moving side plate 3 rotates on a shaft 15 of the spindle connecting device 5 to bring the electrode tip E1 close to the electrode tip E2 thereby to perform the pressing action to clamp the workpiece from the two sides and the electrode releasing action.

The stationary side plate 4 includes two symmetric plates 4a and 4b, which are arranged to confront each other in parallel through a predetermined spacing. On the left ends of the two plates 4a and 4b, there is formed a joint, in which a plate side connecting plate 4d having a generally recessed section and rising from the two sides of a rectangular arm connecting plate 4c perpendicular to the arm center line of the longitudinal direction of the gun arm 7 and the inner side faces of the two plates are laid over each other. The joint is reliably fixed from the two sides of the two plates 4a and 4b individually by means of four bolts B1 on one side.

On the right end of the two plates 4a and 4b, as shown in FIG. 3, a robot side connecting plate 4e having a generally recessed section is so reliably fixed by three bolts B2 as is clamped between the left and right inner side faces of the plates.

Six bolt holes b0 for attaching the robot side connecting plate 4e to the robot arm (although not shown) are formed on a circumference of the plate 4e. The robot side connecting plate 4e is made of an aluminum alloy. The stationary side plate 4 acts as the gun bracket and the gun arm, which are attached to the robot arm.

The moving side plate 3 includes two symmetric plates 3a and 3b, the side faces of which are arranged in parallel to each other through a predetermined spacing, and have a basic structure similar to that of the stationary side plate 4. The leading ends of the two plates 3a and 3b, which are arranged in parallel through the predetermined spacing, abut in a direction perpendicular to the bottomed face of an arm side connecting plate 3c having a generally recessed section, and the overlaps between the side plate 3d of the moving side plate 3 and the side plate rising at a right angle from the two sides of the arm side connecting plate 3c are reliably fixed as the joint portions from the side plates 3d on the two side plates of the arm side connecting plate 3c by means of four bolts B3 on each side.

The electric motor M is a servo motor. This electric motor is arranged in a space owned between the two plates of the stationary side plate 4, as shown in FIG. 1 and FIG. 3, so that its body is so supported from the two sides between the two confronting plates 4a and 4b through a spindle m as can rock.

The leading end of the guide rod 14 of the motor M is so connected to the rear end of the moving side plate 3 through a spindle n as can rock.

The welding transformer T is arranged in the space, which is formed between the spindle connecting device 5 and the electric motor M and which is owned between the two plates of the stationary side plate 4, and is reliably supported on the two confronting plate sides by a plurality of bolts B4.

The gun arms 6 and 7 are so designed and manufactured according to the variation of the panel work as to correspond to a two-dimensional shape change. The material is cast of an aluminum alloy or a copper alloy. At the base portions of the gun arms 6 and 7, there are formed connecting plates 6a and 7a, which have mounting faces in the direction to intersect at a right angle with the axial center line of the longitudinal direction extending from the gun arms acting as the joints of the arm side connecting plates 3c and 4c. The individual gun arms 6 and 7 are firmly fixed such that the connecting plates 6a and 7a are fixed on the front faces of the arm side connecting plate 4c of the stationary side plate 4 and the arm side connecting plate 3c of the moving side plate 3 by mechanical fastening means such as six bolts B5 while insulating the plate side electrically through individual insulating plates 16.

In the leading end portions of the gun arms 6 and 7 and in the arm axis direction, there are formed sectionally cylindrical recesses 28, in which round tip holders 8 and 9 made of a copper alloy are inserted and are reliably held by shrinking expanding slots U formed in the sectionally cylindrical recesses 28 by the fastening forces of bolts B7.

The spindle connecting device 5 has bearing holes formed in one moving side plate 3 and in the other stationary side plate 4, and the moving side plate 3 is rotatably connected to the bearing holes through the column-shaped shaft 15 made of one iron member. In the spindle connecting device, as shown in detail in FIG. 2, FIG. 3 and FIG. 5, there are assembled at symmetric positions: a cylindrical intermediate collar 17 which is inserted concentrically of the center line X-X of the axis of the shaft 15; oilless bearings 18 (or non-lubrication bearings) of a cylindrical short copper alloy inserted from the two side ends into the intermediate collar 17 (inserted between the shaft 15 and the intermediate collar 17) and having flanges 19 bent radially from bearing portions in which the shaft 15 is inserted; and iron bearings 20 (or flanged bearings) having flanges 21 bent radially from bearing portions in which the shaft 15 is inserted.

Figure 5:
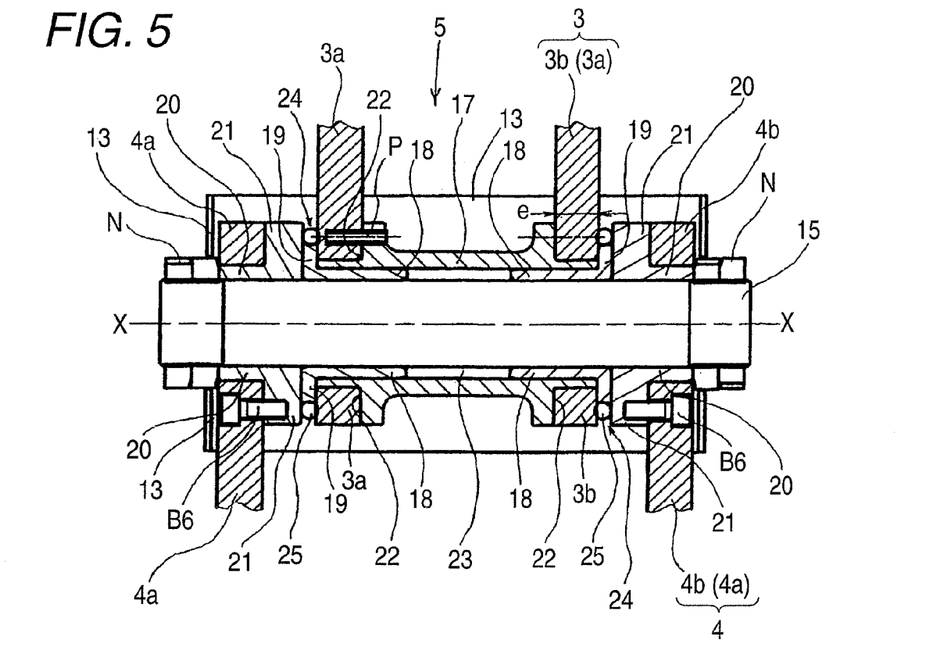
FIG. 5 is an enlarged sectional view taken in the direction of arrow A-A of FIG. 1 and showing a spindle connecting device.

The flanges 19 of the oilless bearings 18 and the flanges 21 of the bearings 20 are so arranged on the shaft 15 that their constriction faces contact with each other in the adjoining directions. In the outer circumferences of the two ends of the intermediate collar 17, there are individually formed generally L-shaped section grooves 22, into which the thickness sizes e of the moving side plates 3 (3a, 3b) are inserted. In these generally L-shaped section grooves 22 formed at the symmetric positions, there are constriction faces, which rise radially from the intermediate collar 17. The intermediate collar 17 is so inserted in the bearing holes of the moving side plates 3 (3a, 3b) that the moving side plates 3 (3a, 3b) are fitted between those constriction faces and the constriction faces of the flanges 19 of the oilless bearings 18. Moreover, rotation stopper pins P are inserted in the directions normal to the constriction faces thereby to position and fix the moving side plates 3 (3a, 3b) and the intermediate collar 17 integrally. On the bearings 20, the stationary side plates 4 (4a, 4b) are fixed in the threaded portions formed in the two circumferences of the shaft, by urging the inward fastening forces from the two sides of the shaft individually with lock nuts N, thereby to form a clearance 23 for reserving a lubricating medium near the generally central position between the shaft 15 and the intermediate collar 17.

Among the intermediate collar 17, the flanges 19 of the oilless bearings 18 and the flanges 21 of the bearings 20, there are formed generally recessed section grooves 24, which are concentric with the shaft 15. In these generally recessed section grooves 24, there are fitted and fixed seal members 25 such as O-rings for sealing the clearance 23, which is formed near the generally central position of the shaft 15 and filled with a lubricating medium, from the outside.

The stationary side plates 4 (4a, 4b), as fitted on the cylindrical outer circumferences of the bearings 20, are fixed on the constriction face of one side of the flanges 21 by means of a plurality of bolts B6. In this case, the fastening positions of the bolts B6 are formed in the lower radial direction of the shaft 15 (in an electrode tip side of the shaft 15 in a radial direction of the shaft 15), and the center lines of the bolts in the axial direction are eccentric to the center line X-X of the axial direction of the shaft 15 and in parallel with the center line. Thus, the fastening force of the bolts B6 fixes the constriction faces between the stationary side plates 4 (4a, 4b) and the flanges 21 against the force, which might otherwise be caused to open the stationary side plates 4 (4a, 4b) on the lower side of the center line X-X and the constriction faces of the flanges 21 of the bearings 20 by the deflection acting on the shaft 15 at the gun pressing time.

The surfaces of the flanges 21 of the bearings 20, which come into sliding contact with the partner side (the flanges 19 of the oilless bearings 18), are subjected to a surface hardening heat treatment with a nitride layer for enhancing the wear resistance and the fatigue resistance. The surfaces of the flanges 19 of the oilless bearings 18, which come into sliding contact with the flanges 21 of the bearings 20, may be subjected to the surface hardening heat treatment with the nitride layer, and also, both the surfaces of the flanges 19 and the surfaces of the flanges 21, which come into sliding contact with each other may be subjected to the surface hardening heat treatment with the nitride layer.

The spindle connecting device 5 is so protected with a protecting cover 13 enclosing it from the front face of the spindle portion as to prevent the intrusion of foreign substances such as spatters, water, oil or fine dust from the outside at the welding time. This protecting cover 13 is formed into such a generally recessed section as has its two ends hooked and supported by the two ends of the shaft 15. The material for the protecting cover 13 is arbitrarily exemplified by a thin brass sheet, plastics, synthetic resins or rubber, but is desirably a light and durable material hard to catch spatters, water, oil or dust.

The longitudinal center line y-y of the welding transformer T arranged between the shaft 15 and the electric motor M and the axial center line Y-Y of the guide rod 14 to be driven by the electric motor M are arranged generally in the common direction. As a result, the secondary circuit wiring, which includes the secondary conductor 10 connecting the welding transformer T and the electrode tips E1 and E2 and/or the shunt 11, is shortened and the moving side plate 3 and the stationary side plate 4 are shortened.

In a cooling device (indicated by a cooling manifold 26 and a single-action joint fixture 27 easy to connect/disconnect a circulation line cooling tube), the gun arms 6 and 7, the secondary conductor 10 and the tip holders 8 and 9 are piped with cooling tubes (although not shown) to circulate the cooling medium in the electrode tips E1 and E2 so that the temperature rise of the electrode tips, which are heated by the resistance heating operation, is blocked by the heating exchanging action of the cooling medium. As described above, the electrically insulated gun arms 6 and 7 are fixed between the moving side plate 3 and the stationary side plate 4 so that the cooling circuit from the gun arms 6 and 7 to the electrode tips E1 and E2 can be shortened.

The welding unit 12 includes one electrode tip E1, which is caused by the drive unit 2 to perform the welding actions to come close to and go far from the other electrode tip E2, the welding transformer T for feeding the welding current between the electrode tips E1 and E2, the movable shunt 11, and/or the secondary conductor 10 having the rigidity.

Next, another example of the structure of the spindle connecting device 5 is shown. According to the embodiment shown in FIG. 6, for example, the single part of the intermediate collar 17 of FIG. 5 and its assembling step number can be omitted by integrating the intermediate collar 17 with the moving side plate 3.

Figure 6:
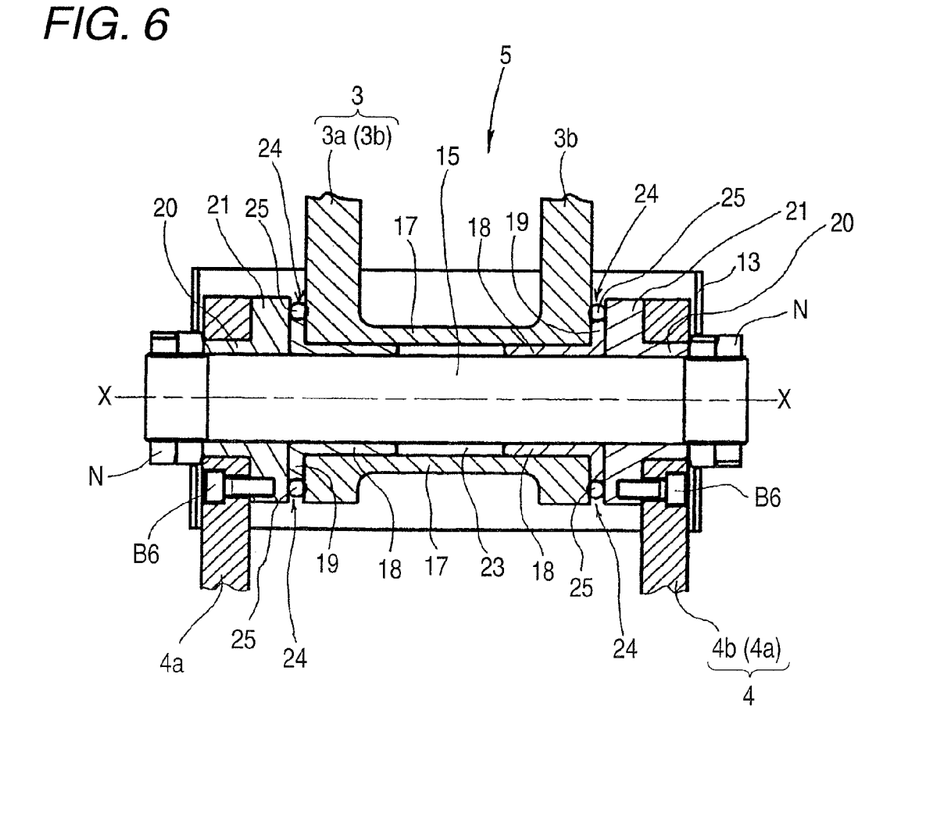
FIG. 6 is a sectional view showing another embodiment of a spindle connecting device according to the invention.

Moreover, the number and the weight of the assembly parts can be reduced by integrating the arm side connecting plates 3c of the generally recessed section type to be attached to the leading end of the moving side plate 3 not as the single part but with the aluminum casting. This integration is likewise applied to the arm side connecting plates 4c of the generally recessed section and the robot side connecting plates 4e to be attached to the leading end of the stationary side plate 4.

According to this embodiment, in case the X-gun 1 has a size Z of 300 mm from the center line X-X of the axial direction of the shaft to the pressure center line of the electrode tips and a size H of 200 mm between the center lines in the longitudinal directions of the upper and lower gun arms, as shown in FIG. 1, the mass of the X-gun can be reduced to 59 Kg while including the electric motor and the welding transformer. This result in at least compactness and light weight equal to or more than those of the air type X-gun having similar specifications.

The actions of the invention are described in the following. In the X-gun 1 of FIG. 1, the controller is taught information such as the position control pattern of one electrode tip E1 by the drive unit 2, the relative speed control pattern and the pressure control pattern at the approaching time of the other electrode tip E2, the robot action, the welding sequence based on the work information, or the welding parameters, so that the welding actions are reproduced by the digital control from the control unit of the controller.

When a weld starting signal is started, the electric motor M of the robot welding gun 1 is activated from a command of the control unit through a motor amplifier thereby to perform the position control by the robot from the standby position to the dot position and to insert the electrode tips into the dot position with the relative positions between the electrode tips E1 and E2. At the same time, the X-gun 1 is stopped. In one electrode tip E1, by the forward movement of the guide rod 14 of the drive unit 2, the moving side plate 3 is rotated together with the oilless bearings 18 and the intermediate collar 17 around the shaft 15 of the spindle connecting device 5. As a result, the electrode tip E1 is brought closer to the other electrode tip E2 thereby to clamp and press the weld zone in between, so that the welding operation is started.

In the actions of the spindle connecting device 5 at this time, the oilless bearings 18, as inserted to the two sides of the intermediate collar 17, slide and rotate on the outer circumference of the shaft 15. As a result, the moving side plate 3 fixed on the intermediate collar 17 rotates together. The shaft 15 is constricted by the bearings 20, and these bearings 20 are constricted on the side of the stationary side plate 4, so that the side faces of the flanges 19 of the oilless bearings 18 slidably rotate on the contact faces of the flanges 21 of the bearings 20 as the moving side plate 3 slidably rotates on the shaft 15.

When the moving side plate 3 rotates, the O-rings 25, which are fitted in the clearances of the recessed section grooves 24 among the moving side plate 3, the flanges 19 of the oilless bearings 18 and the flanges 21 of the bearings 20, are elastically pushed onto the inner walls of the recessed section grooves 24 so that they slide gastight on the contact faces on the drive side. By completely sealing the grease sump in the clearance 23 between the shaft 15 and the intermediate collar 17, the bearings are made oilless thereby to smooth the rotating motion around the shaft.

The movement of the electrode tip E1 of the moving side plate 3 is set, in this case, to the maximum stroke of 125 mm and the welding stroke of 0 to 95 mm. The set stroke is detected in response to an output signal from a position detector (e.g., an encoder) of the electric motor M. The electrode tip E1 moves to a predetermined position to press the welding dot position of the workpiece between it and the other electrode tip E2. When it is confirmed with a motor torque current that a predetermined pressure of 6.0 kN is reached, the switch of a contactor is driven in response to a power starting signal of a timer (or a weld control device) for controlling the welding power source in response to a command from the control unit of the controller. A welding current is fed from the welding transformer T to between the electrode tips E1 and E2 at a rate of 10% of the allowable working percentage of the maximum welding current of 13,500 A so that a nugget is formed to weld the weld zone with the resistance heat.

The cooling water flows from the feed port of the cooling manifold 26 through the cooling tube and further from the gun arms 6 and 7 through the circulation line cooling medium passage, and circulates in the individual electrode tips E1 and E2 so that it passes through the cooling medium passage on the return side until it returns to the drain port of the cooling manifold 26 from the cooling tube which is connected on the side faces opposite to the gun arms 6 and 7 to the single-action joint fixture 27. Meanwhile, the gun arms 6 and 7 are cooled, and the cooling water is concentratedly fed to the electrode tips E1 and E2 including the tip holders 8 and 9, thereby to circulate and cool the individual electrode tips efficiently.

On the other hand, the cooling water to circulate in the secondary coil of the welding transformer T passes through the side face of the shunt 11 and the circulation line cooling medium passage of the secondary conductor 10, and returns to the drain port of the cooling manifold 36.

After the end of the welding operation, in response to a command from the control unit of the controller, the electric motor M is reversed to move the electrode tip E1 to the original position, i.e., the guide rod 14 in the backward direction by the ball screw and the ball nut. By this action, the intermediate collar 17 and the oilless bearings 18 are integrally rotated together with the moving side plate 3 around the shaft 15 of the spindle connecting device 5 so that the full stroke is opened in the direction apart from the electrode tip E2, thus completing one cycle of the spot welding operation.

Figure 4:
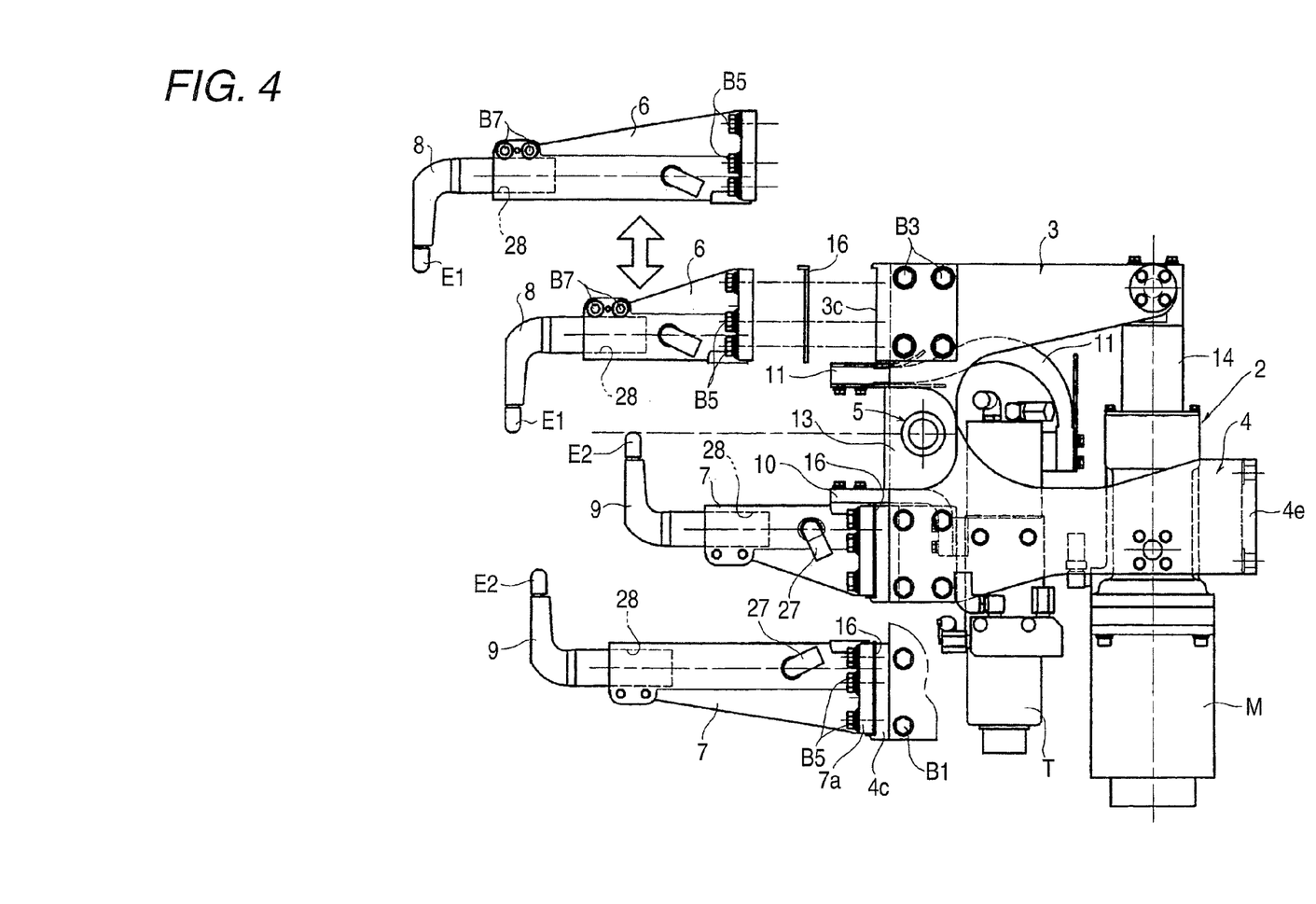
FIG. 4 is a side elevation showing an embodiment of the invention apparatus and presents an assembly diagram corresponding to various gun arms.

In the X-gun 1 according to the invention, the electric insulation is performed at the stationary side plate 4 and the moving side plate 3, as divided from the gun arms, thereby to make the insulation unnecessary on the side of the shaft 15 of the spindle connecting device 5. Thus, the durability of the shaft can be improved while making the spindle connecting device simple and oilless. In addition, even in case the shape and size of an article to be welded are changed, as embodied in FIG. 4, the stationary side plate 4 and the moving side plate 3 belong to a common unit so that they can be easily prepared merely by reassembling the gun arms having a pocket size according to the variation of the weld zone. It is also advantageous for the standard design of the unit-shared parts that the upper and lower gun arms can be inverted upside down.

According to the invention, moreover, the assembling distance between the gun arms and the welding transformer can be drastically shortened to reduce the size and weight of the secondary circuit and the cooling circuit drastically. In addition, the invention is remarkably effective for reducing the impedance, as caused by the welding quality improvement, and for the electrode cooling actions.

In the embodiment, the resistance spot welder according to the invention has been described on the X-type electric pressure robot welding gun using the servo motor as the actuator for the pressure drive source. However, the gist of the invention should not be limited thereto, but can also be applied to an air type robot welding gun using the air cylinder, the various portable welding guns or other similar machines.

According to an aspect of the invention, the moving side plate and the stationary side plate are individually electrically insulated, whereby the electric insulation at the spindle connecting device of the individual plates is made unnecessary. The insulating washers to be inserted into the two faces of the bearings between the moving side plate and the stationary side plate and the fastening means for fixing the insulating washers can be omitted to reduce the number of expensive parts and to shorten the axial length of the shaft thereby to reduce the size and weight of the spindle connecting device and to cut the cost.

According to an aspect of the invention, the stationary side plate and the gun arms are removably connected so that the stationary side plate acts as the gun bracket.

According to an aspect of the invention, the actuator and the welding transformer are disposed in the predetermined space.

According to an aspect of the invention, the clearance for reserving the lubricating medium is formed in the vicinity of the central portion between the intermediate collar and the shaft. As a result, the spindle connecting device is realized to be oilless, thereby to improve the wear resistance and the durability of the shaft and a rotational sliding portion.

According to an aspect of the invention, the constriction faces between the stationary side plate positioned in the lower radial direction (on a side of the electrode tip) than the center line X-X of the shaft and the flanges of the bearings are fixed by mechanical fastening means. When the moving side plate rotates on said shaft at the pressing time of the electrode tips, the shaft moves downward to establish deflection, so that a force is generated by that deflection force between the upper stationary side plate connected concentrically to the shaft and the flanges of the bearings in the direction contact with each other. Between the stationary side plate positioned in the lower radial direction than the center line X-X and the flanges, on the contrary, the force acts in the direction for the contacting constriction faces to separate, thereby to establish the clearance in the constriction faces to contact with the stationary side plate and the flanges of the bearings. Considering this clearance, only the lower side of the shaft is reliably fixed by the mechanical fastening means. As a result, the stationary side plate is reliably stopped in rotation at the spindle connecting portion, and the trouble due to the offset wear of the bearings by the deflection is eliminated to stabilize the rotational motion and to improve the durability.

According to an aspect of the invention, the clearance formed near the substantially central position of the shaft for filling the lubricating medium is sealed from the outside. This makes it possible to prevent a foreign substance such as spatters or dust, as might otherwise fly at the welding time, from intruding into or sticking to the sliding faces.

According to an aspect of the invention, even in case the shape and size of the panel work are changed, the individual moving and stationary side plates connected to the spindle connecting device are the common unit parts so that they are easily enabled to cope with the variations of the work by removing and exchanging only the gun arms having a different pocket size. In short, the parts are common other than the gun arms, even in case the pocket sizes are varied, so that the cost can be reduced.

According to an aspect of the invention, the wear resistance and the fatigue resistance of the sliding contact rotational drive portions of the bearings are enhanced to improve the durability of the shaft.

According to an aspect of the invention, the wiring structures of the secondary circuit and the cooling circuit of a welding unit including a second conductor for connecting the welding transformer and the electrode tips and/or a shunt are easily simplified and shortened. By the reduction of not only the weight but also the impedance of the secondary circuit, a stable welding current can be fed to the weld zone thereby to improve the welding quality.

According to as aspect of the invention, the moving side plate and the stationary side plate can be made into a standardized compact design as the unit structure, in which they are connected to the spindle connecting device, so that the X-gun can be reduced in size, weight and cost.

What is claimed is:

1. A resistance spot welder comprising:
a first plate;
a second plate rotatably connected to the first plate through a shaft, and driven on the shaft by an actuator;
gun arms, removably fixed on and electrically insulated with the first and second plates, respectively;
electrode tips, confronting each other, and fixed on the gun arms, respectively;
a cylindrical collar, inserted concentrically on the shaft, and being shorter than the shaft;
a first bearing, including a first bearing portion adapted to be slid on the shaft; and
a second bearing, including a second bearing portion adapted to be slid on the shaft, wherein
a clearance for reserving a lubricating medium is formed near a central position of the shaft,
the first plate includes a pair of plates which confront each other and are arranged in a first direction with a predetermined space therebetween,
the actuator and a welding transformer are arranged in the predetermined space in a second direction perpendicular to the first direction,
the first bearing is inserted between the shaft and the collar and includes a first flange portion radially rising on the first bearing portion,
the second bearing includes a second flange portion radially rising on the second bearing portion,
the first flange portion and the second flange portion are arranged concentrically on the shaft and held in contact with each other,
the first plate is integrally fixed on the second bearing and the second plate is integrally fixed on the collar, and
the clearance is formed near a central position between the shaft and the collar.

2. The resistance spot welder according to claim 1, wherein the first plate is fixed on the second bearing by a plurality of fastening members in a fastening direction,
the fastening direction is eccentric from and parallel to an axial direction of the shaft, and
the plurality of fastening members are provided in an electrode tip side of the shaft in a radial direction of the shaft.

3. The resistance spot welder according to claim 1, wherein a seal member for sealing the clearance from an outside is fitted and fixed in an annular recessed groove defined among the second plate, the first bearing and the second bearing.

4. The resistance spot welder according to claim 3, wherein first connecting members fixed on one end of each of the first plate and the second plate and second connecting members formed integrally with the gun arms in a direction perpendicular to a longitudinal direction in which the gun arms extend are removably fixed in an insulated state.

5. The resistance spot welder according to claim 4, wherein a surface of at least one of the first and second flange portions at which the first and the second flange portions are held in sliding contact with each other is subjected to a hardening heat treatment with a nitride layer.

6. The resistance spot welder according to claim 5, wherein the welding transformer is supported between the pair of plates of the first plate.

7. The resistance spot welder according to claim 6, wherein the welding transformer is arranged between the shaft and the actuator, and
a longitudinal direction of the welding transformer and an axial direction of a pressure rod driven by the actuator are substantially in parallel to each other.

* * * * *